(12) United States Patent
Ahn et al.

(10) Patent No.: US 10,097,326 B2
(45) Date of Patent: Oct. 9, 2018

(54) COMMUNICATION METHOD FOR MBMS AND APPARATUS USING SAME

(71) Applicant: LG ELECTRONICS INC., Seoul (KR)

(72) Inventors: Joonkui Ahn, Seoul (KR); Yunjung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/322,710

(22) PCT Filed: Jul. 1, 2015

(86) PCT No.: PCT/KR2015/006777
§ 371 (c)(1),
(2) Date: Dec. 28, 2016

(87) PCT Pub. No.: WO2016/003198
PCT Pub. Date: Jan. 7, 2016

(65) Prior Publication Data
US 2017/0155485 A1 Jun. 1, 2017

Related U.S. Application Data

(60) Provisional application No. 62/019,437, filed on Jul. 1, 2014.

(51) Int. Cl.
*H04L 5/00* (2006.01)
*H04W 72/04* (2009.01)
(Continued)

(52) U.S. Cl.
CPC .......... *H04L 5/0048* (2013.01); *H04W 36/04* (2013.01); *H04W 72/0446* (2013.01); *H04L 12/189* (2013.01)

(58) Field of Classification Search
None
See application file for complete search history.

(56) References Cited

U.S. PATENT DOCUMENTS

2010/0062783 A1* 3/2010 Luo .................. H04J 11/0069
455/450
2010/0172281 A1* 7/2010 Hus .................. H04L 1/1607
370/312

(Continued)

OTHER PUBLICATIONS

3rd Generation Partnership Project, "Technical Specification Group Radio Access Network; Evolved Universal Terrestrial Radio Access (E-UTRA); Physical Channels and Modulation (Release 10)", 3GPP TS 36.211 V10.2.0, Jun. 2011, section 4, pp. 9-11 (5 pages provided).

(Continued)

*Primary Examiner* — Bunjob Jaroenchonwanit
(74) *Attorney, Agent, or Firm* — Lee, Hong, Degerman, Kang & Waimey

(57) ABSTRACT

Provided are a communication method and an apparatus for a multimedia broadcast multicast service (MBMS) in a wireless communication system. A wireless device determines, from among a plurality of subframes, a shared multimedia broadcast multicast service single frequency network (MBSFN) subframe utilized in a plurality of MBSFN regions, and receives a shared MBSFN reference signal (RS) from within the shared MBSFN subframe.

5 Claims, 9 Drawing Sheets

(51) Int. Cl.
*H04W 36/04* (2009.01)
*H04L 12/18* (2006.01)

(56) References Cited

U.S. PATENT DOCUMENTS

| | | | | |
|---|---|---|---|---|
| 2012/0094699 | A1* | 4/2012 | Tamura | H04W 48/12 |
| | | | | 455/458 |
| 2012/0122472 | A1* | 5/2012 | Krishnamurthy | H04L 5/0053 |
| | | | | 455/456.1 |
| 2012/0163305 | A1* | 6/2012 | Nimbalker | H04W 52/0206 |
| | | | | 370/329 |
| 2012/0213203 | A1* | 8/2012 | Jung | H04L 5/001 |
| | | | | 370/331 |
| 2012/0236776 | A1* | 9/2012 | Zhang | H04W 48/12 |
| | | | | 370/312 |
| 2012/0300689 | A1 | 11/2012 | Lee et al. | |
| 2012/0314645 | A1 | 12/2012 | Aoyama et al. | |
| 2013/0294317 | A1 | 11/2013 | Malladi et al. | |
| 2014/0016491 | A1* | 1/2014 | Gholmieh | H04W 24/08 |
| | | | | 370/252 |
| 2014/0119263 | A1 | 5/2014 | Shauh et al. | |
| 2015/0195032 | A1* | 7/2015 | Sharma | H04B 7/15557 |
| | | | | 370/315 |
| 2015/0201249 | A1* | 7/2015 | Ryu | H04N 21/6405 |
| | | | | 725/62 |
| 2016/0295443 | A1* | 10/2016 | Mizusawa | H04W 76/002 |
| 2016/0338011 | A1* | 11/2016 | Mizusawa | H04W 4/06 |
| 2016/0352554 | A1* | 12/2016 | Mizusawa | H04W 24/08 |
| 2017/0257789 | A1* | 9/2017 | Mizusawa | H04W 24/10 |

OTHER PUBLICATIONS

PCT International Application No. PCT/KR2015/006777, International Search Report dated Oct. 8, 2015, 3 pages.

* cited by examiner

FIG. 5

| C-MBSFN Area C-MBSFN RS | MBSFN Area1 MBSFN RS1 | MBSFN Area1 MBSFN RS1 | MBSFN Area2 MBSFN RS2 | MBSFN Area2 MBSFN RS2 | C-MBSFN Area C-MBSFN RS | MBSFN Area1 MBSFN RS1 | MBSFN Area1 MBSFN RS1 | MBSFN Area2 MBSFN RS2 | MBSFN Area2 MBSFN RS2 |
|---|---|---|---|---|---|---|---|---|---|
| SF0 | SF1 | SF2 | SF3 | SF4 | SF5 | SF6 | SF7 | SF8 | SF9 |

COMMUNICATION METHOD FOR MBMS AND APPARATUS USING SAME

CROSS-REFERENCE TO RELATED APPLICATIONS

This application is the National Stage filing under 35 U.S.C. 371 of International Application No. PCT/KR2015/006777, filed on Jul. 01, 2015, which claims the benefit of U.S. Provisional Application No. 62/019,437, filed on Jul. 01, 2014, the contents of which are all hereby incorporated by reference herein in their entirety.

BACKGROUND OF THE INVENTION

Field of the invention

The present invention relates to wireless communications, and more particularly, to a communication method for a multimedia broadcast multicast service (MBMS) in a wireless communication system, and an apparatus using the method.

Related Art

A multimedia broadcast multicast service (MBMS) is a service in which a plurality of transmission points (TPs) simultaneously transmit the same data packet to a plurality of users. Since the plurality of users receive the same multimedia data, resource efficiency can be increased. A Multimedia Broadcast multicast service Single Frequency Network (MBSFN) provides transport features for an MBMS service in $3^{rd}$ generation partnership project (3GPP) long term evolution (LTE).

In general, the MBMS is provided as one of additional services. However, a carrier designed to provide only the MBMS service is introduced recently.

There is a need for a method for effectively providing the MBMS service in a dedicated carrier for the MBMS service.

SUMMARY OF THE INVENTION

The present invention provides a communication method for a multimedia broadcast multicast service (MBMS) and an apparatus using the same.

In an aspect, a communication method for a multimedia broadcast multicast service (MBMS) in a wireless communication system includes determining, by a wireless device, a common Multimedia Broadcast service Single Frequency Network (MBSFN) subframe commonly used in a plurality of MBSFN areas among a plurality of subframes, and receiving, by the wireless device, a common MBSFN reference signal (RS) in the common MBSFN subframe.

The common MBSFN subframe may be operated by a dedicated MBSFN cell.

In another aspect, an apparatus for a multimedia broadcast multicast service (MBMS) in a wireless communication system includes a radio frequency (RF) unit configured to transmit and receive a radio signal, and a processor operatively coupled to the RF unit. The processor is configured to determine a common Multimedia Broadcast service Single Frequency Network (MBSFN) subframe commonly used in a plurality of MBSFN areas among a plurality of subframes, and control the RF unit to receive a common MBSFN reference signal (RS) in the common MBSFN subframe.

A multimedia broadcast multicast service (MBMS) service may be provided in a dedicated Multimedia Broadcast multicast service Single Frequency Network (MBSFN) cell.

BRIEF DESCRIPTION OF THE DRAWINGS

FIG. 5 shows a radio frame structure for a dedicated MBSFN cell according to an exemplary embodiment of the present invention.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) based on 3GPP Technical Specification (TS). This is for exemplary purposes only, and the present invention is also applicable to various wireless communication systems.

A wireless device may be served by a plurality of serving cells under carrier aggregation (CA) or dual connectivity. Each serving cell may be defined by a downlink (DL) component carrier (CC) or a pair of a DL CC and an uplink (UL) CC.

A serving cell may be classified into a primary cell and a secondary cell. The primary cell operates at a primary frequency, performs an initial connection establishment procedure, initiates a connection reestablishment procedure or is designated as a primary cell during a handover. The primary cell may be referred to as a reference cell. The secondary cell operates at a secondary frequency and is configured after establishing a radio resource control (RRC) connection. The secondary cell is used to provide additional radio resources. At least one primary cell is always configured but the secondary cell may be added/modified/released by a upper layer signaling (e.g. RRC message).

A cell index (CI) of the primary cell may be fixed. For example, lowest CI may be set as the CI of the primary cell. Hereinafter, the CI of the primary cell is set to zero and the CI of a secondary cell may be assigned subsequently starting from one.

In communication system, there are two duplex schemes: time division duplex (TDD) and frequency division duplex (FDD). In TDD, uplink communication and downlink communication uses a same frequency band. In FDD, uplink communication and downlink communication uses different frequency bands.

Figure 1:
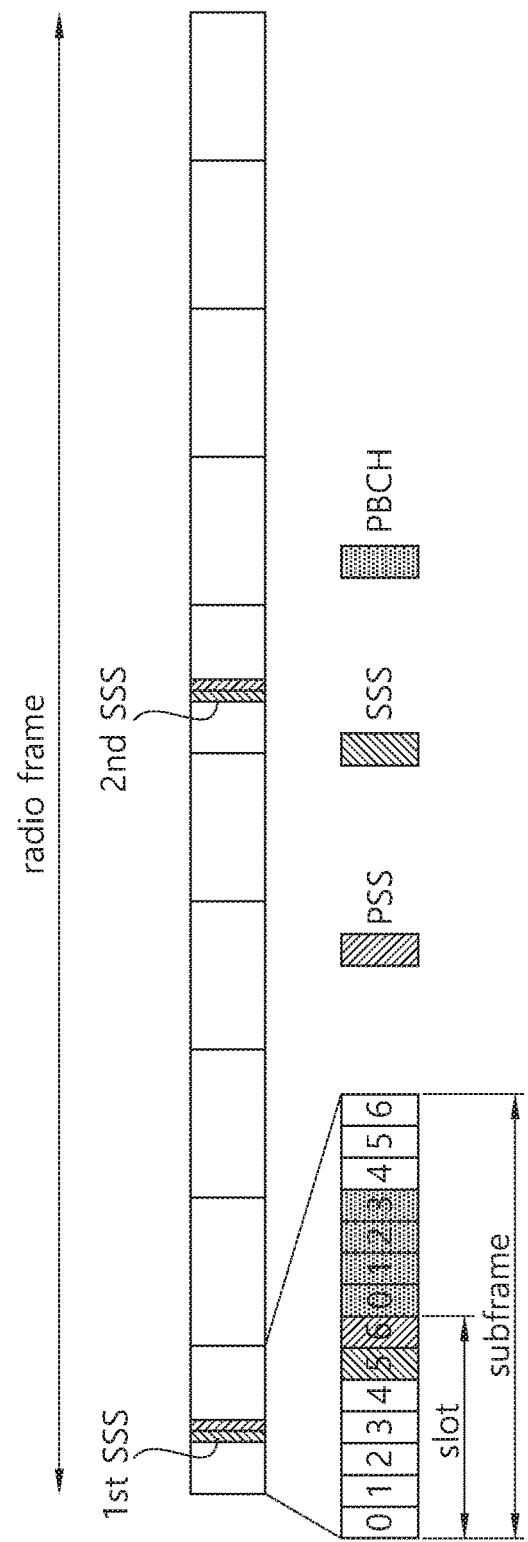
FIG. 1 shows a structure of a downlink radio frame in $3^{rd}$ generation partnership project (3GPP) long term evolution (LTE).

FIG. 1 shows a structure of a downlink radio frame in 3GPP LTE. The section 4 of 3GPP TS 36.211 V10.2.0 (2011-06) "Evolved Universal Terrestrial Radio Access (E-UTRA); Physical Channels and Modulation (Release 10)" may be incorporated herein by reference.

A subframe is a unit for scheduling in 3GPP LTE. For example, one subframe may have a length of 1 millisecond (ms) which is referred as a transmission time interval (TTI). A radio frame includes 10 subframes and one subframe includes 2 consecutive slots. A subframe may include a plurality of orthogonal frequency division multiplexing (OFDM) symbols. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc. According to 3GPP LTE, in case of a normal cyclic prefix (CP), one subframe includes 14 OFDM symbols, and in case of an extended CP, one subframe includes 12 OFDM symbols.

Physical channels of 3GPP LTE may be classified into a DL physical channels and UL physical channels. The DL physical channels include a physical downlink control channel (PDCCH), a physical control format indicator channel (PCFICH), a physical hybrid-ARQ indicator channel (PHICH) and a physical downlink shared channel (PDSCH). The UL physical channels include a physical uplink control channel (PUCCH) and a physical uplink shared channel (PUSCH).

Synchronization signals (SSs) include a primary synchronization signal (PSS) and a secondary synchronization signal (SSS). The SS is used for a cell search.

The PSS is transmitted in a first OFDM symbol of a first slot (i.e. a first slot of a first subframe having an index 0) and a last OFDM symbol of a 11-th OFDM symbol (i.e. a first slot of sixth subframe having an index of 5). The PSS is used to acquire a OFDM symbol synchronization and a slot synchronization. The PSS is associated with a physical cell identity (PCI). Among three candidates PSS, one PSS is chosen based on the PCI.

The SSS includes a first SSS and a second SSS. The first and second SSSs are transmitted in OFDM symbols contiguous OFDM symbols carrying the PSS. The SSS is used to acquire a frame synchronization. The SSS and the PSS is also used to acquire the PCI. The first and second SSSs use different secondary synchronization codes (PSCs). When the first and second SSSs include 31 subcarriers respectively, each SSC having a length of 31 is used for the first and second SSSs.

504 PCIs can be identified by a combination of 3 PSSs and 168 SSSs. PSS, SSS and PBCH is transmitted in center 6 RBs within a system bandwidth. Any wireless device can detect these signals in any system bandwidth.

The PSS can be defined as a Zadoff-Chu sequence having a length of Ns as shown:

$$z(n) = e^{-j\frac{\pi qm(m+1)}{Ns}} \qquad \text{[Equation 1]}$$

where q denotes a root index, m=0,1, . . . , Ns−1, and Ns=63. To define 3 PSS, q may be set to 25, 29 or 34.

A sequence for the SSS is generated by two m-sequences S1 and S2, each having a length of 31. When a first SSS is defined as (S1, S2), a second SSS can be defined as (S2, S1) by swapping S1 and S2. S1 and S2 are scrambled with different scrambling sequences.

Now, a Multimedia Broadcast multicast service Single Frequency Network (MBSFN) for a multimedia broadcast multicast service (MBMS) will be described.

Figure 2:
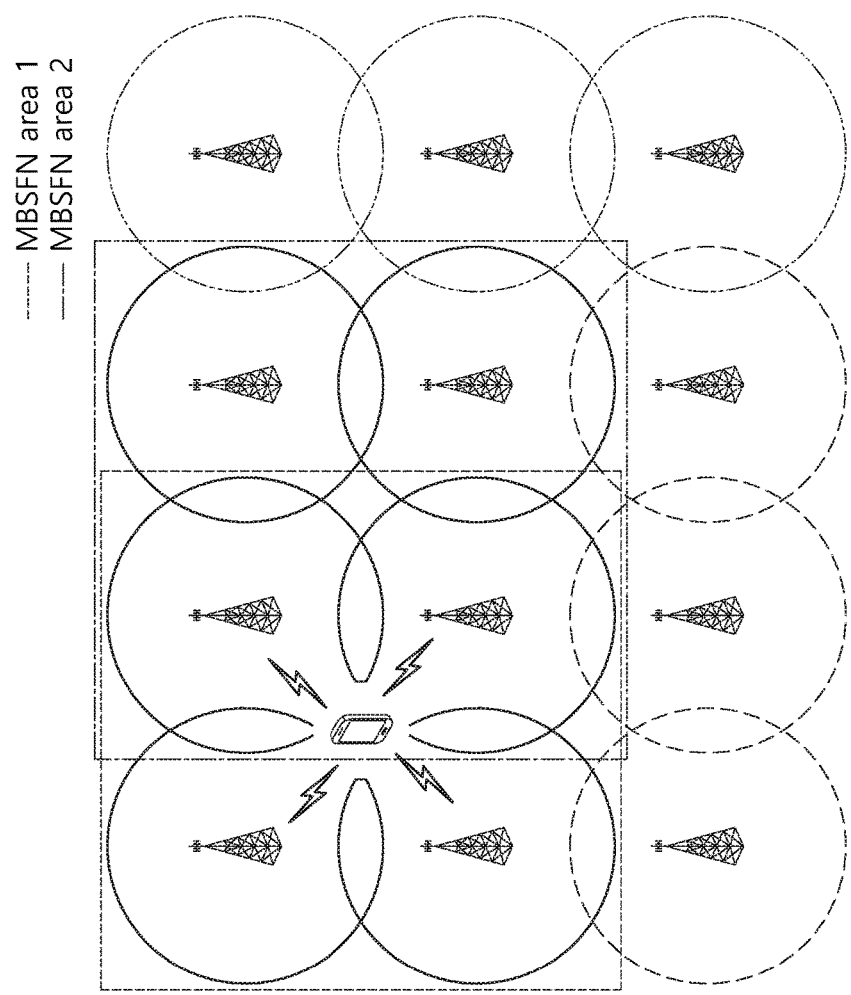
FIG. 2 shows an example of a Multimedia Broadcast multicast service Single Frequency Network (MBSFN).

FIG. 2 shows an example of an MBSFN.

Each circle indicates a coverage of a corresponding transmission point (TP), and the TP may correspond to one BS or cell. A TP having a circle indicated by a solid line indicates synchronized TPs. A group configured of TPs for providing the same MBMS service in the synchronized TPs can be created, and this is called an MBSFN area. One or more MBSFN areas may be configured to one wireless device.

In 3GPP LTE, an MBSFN subframe is defined for MBSFN transmission. In a radio frame structure of FIG. 1, at least any one of the remaining subframes other than subframes 0 and 5 may be configured as the MBSFN subframe. This is because the subframes 0 and 5 are used in transmission of an SS. The MBSFN subframe has an extended CP, and includes 12 OFDM symbols.

First one or two OFDM symbols of the MBSFN subframe are used in TP-specific transmission as a non-MBSFN symbol, and the remaining symbols are used in MBSFN transmission.

In the MBSFN transmission, a plurality of TPs transmit the same MBSFN data in the MBSFN subframe belonging to the same MBSFN area. A channel in which the MBSFN data is transmitted is called a Physical Multicast CHannel (PMCH).

An MBSFN reference signal (RS) used in demodulation of the MSFN data is transmitted in an area of the MBSFN subframe in which the PMCH is transmitted.

Figure 3:
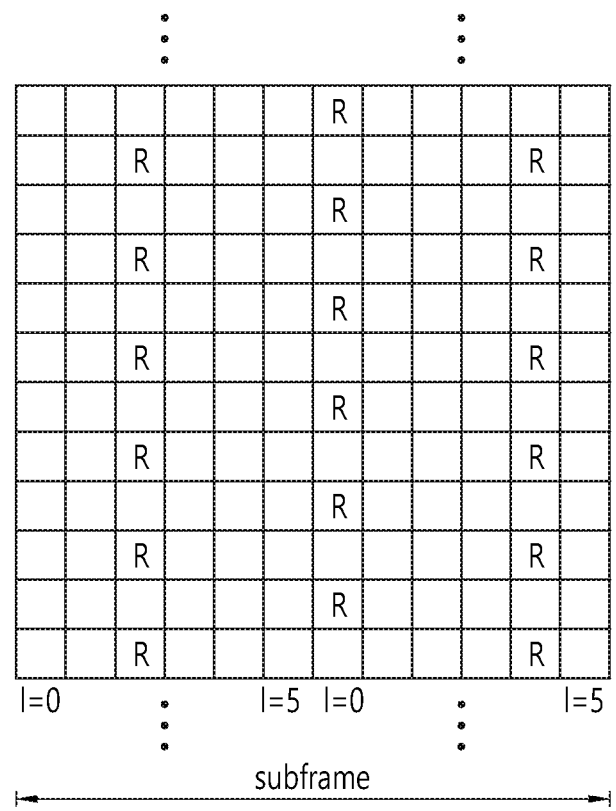
FIG. 3 shows an example of an MBSFN reference signal (RS).

FIG. 3 shows an example of an MBSFN RS.

The MBSFN RS is transmitted in OFDM symbols 3, 7, and 11 of an MBSFN subframe. 'R' indicates a resource element (RE) location at which the MBSFN RS is transmitted.

An MBSFN RS sequence r(m) may be defined as follows.

$$r(m) = \frac{1}{\sqrt{2}}(1 - 2\cdot c(2m)) + j\frac{1}{\sqrt{2}}(1 - 2\cdot c(2m+1)) \qquad \text{[Equation 2]}$$

Herein, m=0,1, . . . , $2N_{BB}-1$, $N_{BB}$ is a bandwidth at which the MBSFN RS is transmitted. A pseudo-random sequence c(i) may be defined by a Gold sequence as follows.

$$c(n)=(x_1(n+Nc)+x_2(n+Nc))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \qquad \text{[Equation 3]}$$

Herein, Nc is integer, n=0, . . . , N−1, N is a length of a sequence, and 'mod' is a modulo operation. The pseudo-random sequence may be initialized by $2^9(7(ns+1)+l+1)(2N_{MBSFN}+1)+N_{MBSFN}$. ns is a slot number in a radio frame, and $N_{MBSFN}$ is an MBSFN area identifier.

Meanwhile, the conventional method of supporting an MBMS is evolved to consider that any component carrier is used as a carrier dedicated for an MBMS service. This is called a dedicated MBSFN cell. In the dedicated MBSFN cell, all subframes may be used as an MBSFN subframe, and a signal such as PSS/SSS/CRS for the conventional DL synchronization may be transmitted to a minimum extent possible or may not be transmitted.

Figure 4:
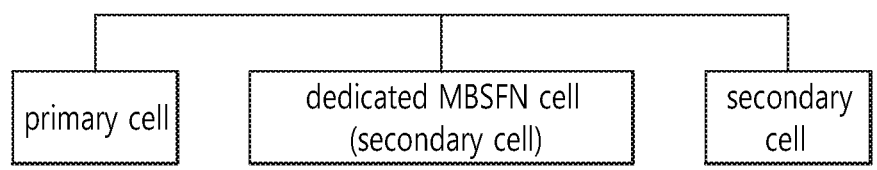
FIG. 4 shows an example of configuring a dedicated MBSFN cell.

FIG. 4 shows an example of configuring a dedicated MBSFN cell.

A primary cell is configured to a wireless device, and at least any one of secondary cells is configured as a dedicated MBSFN cell. The dedicated MBSFN cell may be activated or deactivated by the primary cell. The number of dedicated MBSFN cells is for exemplary purposes only. Information regarding the dedicated MBSFN cell may be given to the wireless device through the primary cell. Alternatively, the MBSFN cell may be operated independently without an aid of other cells.

FIG. 5 shows a radio frame structure for a dedicated MBSFN cell according to an exemplary embodiment of the present invention.

SF0 to SF9 denote subframes in a radio frame, and two MBSFN areas (i.e., an MBSFN area 1 and an MBSFN area 2) are assumed. All subframes may be MBSFN subframes used in MBSFN transmission.

SF1, SF2, SF6, and SF7 are used in transmission for the MBSFN area 1, and SF3, SF4, SF8, and SF9 are used in transmission for the MBSFN area 2. An SF index and the number of MBSFN areas are for exemplary purposes only.

A wireless device may use an MBSFN RS transmitted in each subframe to maintain frequency-time synchronization for the dedicated MBSFN cell. However, the MBSFN RS is an MBSFN area-specific RS, and TPs belonging to different MBSFN areas transmit different MBSFN RSs. From a perspective of reception of the wireless device, a radio channel feature such as a propagation delay, a Doppler spread, a delay spread, or the like which is experienced by the MBSFN RS may be significantly different for each MBSFN area. Therefore, frequency-time synchronization performance may deteriorate when the MBSFN RSs received through different MBSFN subframes are combined and used to maintain the frequency-time synchronization.

In order to maintain the frequency-time synchronization of a plurality of MBSFN areas, a common MBSFN area (C-MBSFN area) and a common MBSFN RS (C-MBSFN RS) are defined. As the C-MBSFN area, an MBSFN area 1 or an MBSFN area 2 may be designated or a new MBSFN area may be designated. A subframe used in transmission of the C-MBSFN area is called a C-MBSFN subframe. Herein, although SF0 and SF5 are defined as a C-MBSFN subframe, the number of C-MBSFN subframes and a location thereof are for exemplary purposes only.

The C-MBSFN RS is transmitted in the C-MBSFN subframe. The C-MBSFN RS may be transmitted irrespective of whether a PMCH is transmitted. The C-MBSFN RS has the same sequence for all MBSFN areas, and may be transmitted in the same location. The C-MBSFN RS may be defined by the sequence of Equation 2, and may be generated by being initialized by a common parameter.

The wireless device may measure a channel on the basis of the same C-MBSFN RS for all MBSFN areas. Accordingly, the wireless device may assume that a radio channel feature such as a propagation delay, a Doppler spread, a delay spread, or the like is identical.

The C-MBSFN subframe may be designed separately from the MBSFN area. Among the MBSFN areas that can be designated, a specific MBSFN area (e.g., an MBSFN area having an index 0) may be designated as a C-MBSFN area.

In an example of supporting the C-MBSFN area in a network, all cells supporting an MBSFN service transmit the same C-MBSFN RS in the C-MBSFN subframe. However, the wireless device does not have to know such a network structure, and for example, each cell may independently operate the C-MBSFN area.

The C-MBSFN subframe may be fixed in advance, or may be configured dynamically/statistically. A method of configuring the C-MBSFN subframe is as follows.

For example, another cell (e.g., a primary cell) other than a dedicated MBSFN cell may inform the wireless device about configuration information related to a C-MBSFN subframe of the dedicated MBSFN cell. The configuration information may be broadcast as system information, or may be transmitted through an RRC message.

For another example, the wireless device may implicitly detect the C-MBSFN subframe. In an available C-MBSFN subframe candidate group, the wireless device may identify the C-MBSFN subframe by detecting a C-MBSFN RS, an SS transmitted in the C-MBSFN RS, and/or an SS transmitted at a location related to a location of the C-MBSFN subframe.

A C-MBSFN RS sequence and an RE location may be fixed in advance or may be configured. A method of configuring a resource for the C-MBSFN RS is as follows.

For example, another cell (e.g., a primary cell) other than a dedicated MBSFN cell may inform the wireless device about resource information related to a C-MBSFN RS of the dedicated MBSFN cell. The resource information may include at least any one of information for generating a sequence of the C-MBSFN RS (e.g., $N_{C-MBSFN}$ for initializing the sequence of Equation 2), an OFDM symbol index for transmitting the C-MBSFN RS, and an RE for transmitting the C-MBSFN RS. The resource information may be broadcast as system information, or may be transmitted through an RRC message.

For another example, the wireless device may implicitly detect the C-MBSFN RS. The wireless device may detect the C-MBSFN RS by detecting an SS having a pre-known relation with the C-MBSFN RS from available C-MBSFN RS resource candidate groups.

Even if it is not designated as the C-MBSFN subframe in advance, all subframes not designated as the MBSFN area may be used as the C-MBSFN subframe. Information (MCCH(MBMS point-to-multipoint Control Channel) configuration, system bandwidth, etc.) required for MBSFN reception may be transmitted through the C-MBSFN subframe.

The wireless device may determine whether the MBMS service can be received through reception quality measurement based on the C-MBSFN RS. The wireless device may report the measured reception quality through the primary cell.

It is assumed in the aforementioned embodiment that the wireless device acquires time synchronization with the dedicated MBSFN cell and maintain this. Information regarding the time synchronization may be given through the primary cell.

However, the primary cell for supporting the dedicated MBMS cell may not exist or, even if the primary cell exists, the wireless device may not be able to acquire or maintain sufficient time synchronization with the dedicated MBSFN cell through the primary cell. Hereinafter, a method for acquiring and maintaining the time synchronization in the dedicated MBSFN cell is proposed.

Figure 6:
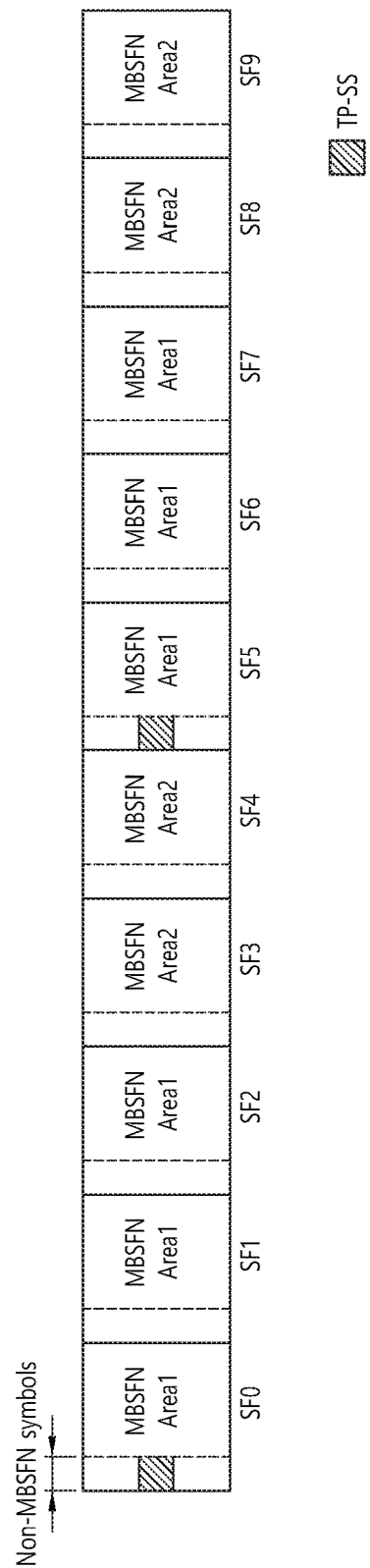
FIG. 6 shows synchronization signal (SS) transmission according to an embodiment of the present invention.

FIG. 6 shows SS transmission according to an embodiment of the present invention.

One or more OFDM symbols in an MBSFN subframe may be defined as a non-MBSFN symbol on which a PMCH is not transmitted. A TP-specific SS (TP-SS) may be transmitted in the non-MBSFN symbol. For example, assume that first two OFDM symbols of the MBSFN subframe are non-MBSFN symbols. It is shown that the TP-SS is transmitted in the non-MBSFN symbol of SFO and SFS.

This method may also be used in transmission of an MBSFN area specific SS instead of the TP-SS. If the dedicated MBSFN cell and a normal cell share the MBSFN subframe in the same carrier, the non-MBSFN symbol may be defined also in the MBSFN subframe of the dedicated MBSFN cell, and the MBSFN area specific SS may be transmitted in the non-MBSFN symbol.

Figure 7:
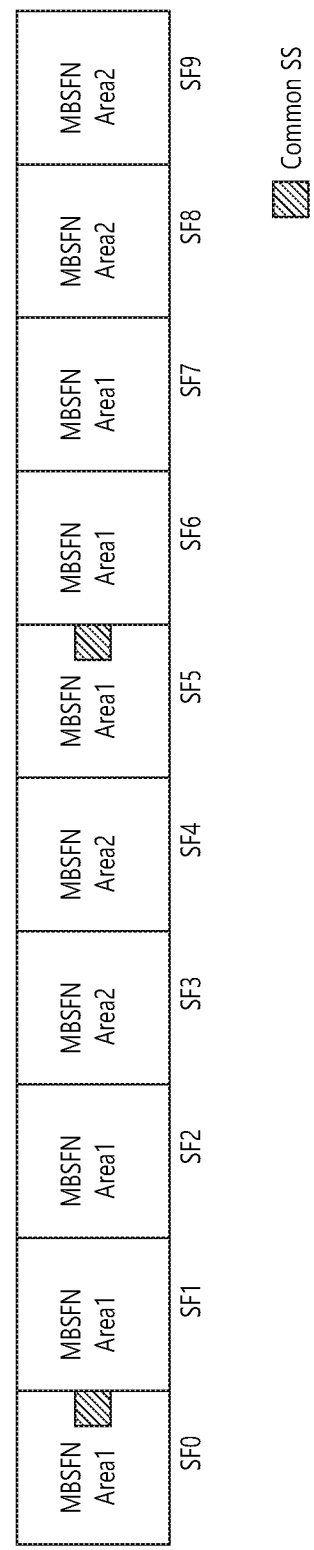
FIG. 7 shows SS transmission according to another embodiment of the present invention.

FIG. 7 shows SS transmission according to another embodiment of the present invention.

A common SS may be introduced for the same reason of introducing the aforementioned C-MBSFN RS. As the common SS, the same sequence may be transmitted in the same RE location by a plurality of cells.

For MBSFN combined reception, the common SS may have the same CP length, OFDM symbol length, and subcarrier interval as other OFDM symbols of the MBSFN subframe. FIG. 7 shows an example of transmitting the common SS periodically through a last OFDM symbol of SFO and SFS.

The common SS may be transmitted through the aforementioned C-MBSFN subframe, and may be transmitted through the same RE and sequence between synchronized cells irrespective of the MBSFN area.

Figure 8:
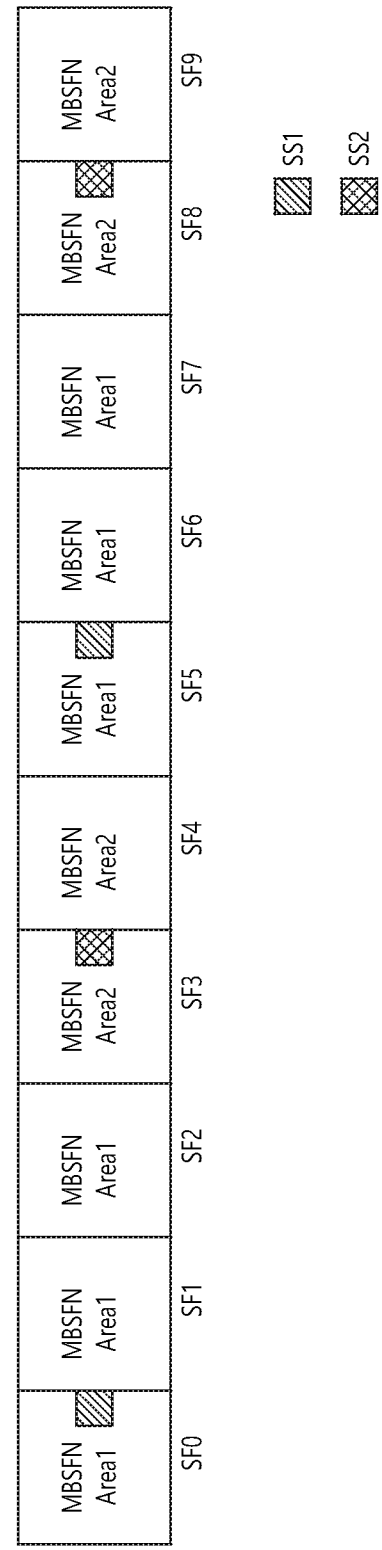
FIG. 8 shows SS transmission according to another embodiment of the present invention.

FIG. 8 shows SS transmission according to another embodiment of the present invention.

If a wireless device does not perform an operation other than reception for an MBSFN area corresponding to MBSFN data received by the wireless device in a dedicated MBSFN cell, an MBSFN area specific SS may be transmitted to acquire synchronization for each MBSFN area. The MBSFN area specific SS may be transmitted through the entirety or part of the MBSFN subframe for each MBSFN area. An RE location and sequence of the MBSFN area specific SS may be determined by an MBSFN area identifier.

In FIG. 8, SS1 is an MBSFN area specific SS of an MBSFN area 1, and SS2 is an MBSFN area specific SS of an MBSFN area 2. It shows that the MBSFN area specific SS is transmitted in a first subframe among a plurality of MBSFN subframes for a corresponding MBSFN area. The number of MBSFN area specific SSs or a location thereof are for exemplary purposes only.

The network may transmit data for the MBMS service through the dedicated MBSFN cell, and may deliver reception information for receiving data of the dedicated MBSFN cell to the wireless device through a normal cell (e.g., primary cell) operated in the same coverage. The data through the dedicated MBMS cell needs to be received by not only a wireless device for establishing an RRC connection but also a wireless device operating in an idle state. Accordingly, the reception information may be broadcast by the normal cell.

The reception information may include any one of the followings.

CP length
System bandwidth
SS sequence and subframe information
C-MBSFN subframe location
C-MBSFN RS RE and sequence information
Whether time(frequency) synchronization of a dedicated MBSFN cell is matched to a carrier within a specific level, or a level of transmission time(/frequency) difference with respect to the carrier.

Figure 9:
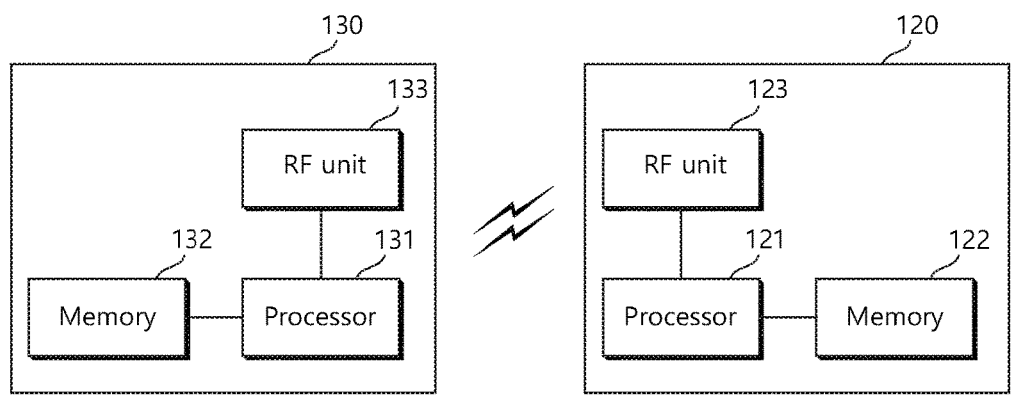
FIG. 9 is a block diagram showing a wireless communication system according to an embodiment of the present invention.

FIG. 9 is a block diagram showing a wireless communication system according to an embodiment of the present invention.

A wireless device 130 includes a processor 131, a memory 132, and a radio frequency (RF) unit 133. The memory 132 is coupled to the processor 131, and stores various instructions executed by the processor 131. The RF unit 133 is coupled to the processor 131, and transmits and/or receives a radio signal. The processor 131 implements the proposed functions, procedures, and/or methods. In the aforementioned embodiment, an operation of the wireless device may be implemented by the processor 131. When the aforementioned embodiment is implemented with a software instruction, the instruction may be stored in the memory 132, and may be executed by the processor 131 to perform the aforementioned operation.

A BS 120 includes a processor 121, a memory 122, and an RF unit 123. The BS 120 may operate in an unlicensed band. The memory 122 is coupled to the processor 121, and stores various instructions executed by the processor 121. The RF unit 123 is coupled to the processor 121, and transmits and/or receives a radio signal. The processor 121 implements the proposed functions, procedures, and/or methods. In the aforementioned embodiment, an operation of the BS may be implemented by the processor 121.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A communication method for a multimedia broadcast multicast service (MBMS) in a wireless communication system, the method comprising:
   determining, by a wireless device served by a primary cell and a secondary cell, a common Multimedia Broadcast service Single Frequency Network (MBSFN) subframe commonly used in a plurality of MBSFN areas among a plurality of subframes, wherein the secondary cell is configured as a dedicated MBSFN cell;

receiving, by the wireless device, a common MBSFN reference signal (RS) in the common MBSFN subframe, the common MBSFN RS for estimating a channel for the plurality of MBSFN areas; and receiving, by the wireless device, a common synchronization signal (SS) for acquiring initial time synchronization with the dedicated MBSFN cell in the common MBSFN subframe if the wireless device does not maintain time synchronization with the dedicated MBSFN cell through the primary cell.

2. The method of claim 1, wherein the dedicated MBSFN cell is activated or deactivated by the primary cell.

3. The method of claim 1, further comprising:
receiving, by the wireless device, reception information of the common MBSFN RS through the primary cell.

4. An apparatus served by a primary cell and a secondary cell for a multimedia broadcast multicast service (MBMS) in a wireless communication system, the apparatus comprising:
a radio frequency (RF) unit that transmits and receives a radio signal; and
a processor operatively coupled to the RF unit and configured to:
determine a common Multimedia Broadcast service Single Frequency Network (MBSFN) subframe commonly used in a plurality of MBSFN areas among a plurality of subframes,
wherein the secondary cell is configured as a dedicated MBSFN cell;
control the RF unit to receive a common MBSFN reference signal (RS) in the common MBSFN subframe, the common MBSFN RS for estimating a channel for the plurality of MBSFN areas; and
control the RF unit to receive a common synchronization signal (SS) for acquiring initial time synchronization with the dedicated MBSFN cell in the common MBSFN subframe if the wireless device does not maintain time synchronization with the dedicated MBSFN cell through the primary cell.

5. The apparatus of claim 4, wherein the dedicated MBSFN cell is activated or deactivated by the primary cell.

* * * * *